United States Patent [19]

Melzer et al.

[11] Patent Number: 4,581,246
[45] Date of Patent: Apr. 8, 1986

[54] PRODUCTION OF MAGNETIC RECORDING MEDIA

[75] Inventors: Milena Melzer, Ludwigshafen; Norbert Schneider, Altrip; Helmut Jakusch, Frankenthal; Werner Balz, Limburgerhof, all of Fed. Rep. of Germany

[73] Assignee: BASF Aktiengesellschaft, Fed. Rep. of Germany

[21] Appl. No.: 756,308

[22] Filed: Jul. 18, 1985

[30] Foreign Application Priority Data

Jul. 18, 1984 [DE] Fed. Rep. of Germany ....... 3426366

[51] Int. Cl.$^4$ .............................................. H01F 10/02
[52] U.S. Cl. ..................... 427/48; 427/128; 427/130
[58] Field of Search .......................... 427/48, 128, 130

[56] References Cited

U.S. PATENT DOCUMENTS 4,310,565 1/1982 Lehner et al. ..................... 427/128
4,328,282 5/1982 Lehner et al. ..................... 428/130

Primary Examiner—Bernard D. Pianalto
Attorney, Agent, or Firm—Keil & Weinkauf

[57] ABSTRACT

Magnetic recording media are produced by preparing a dispersion consisting of finely divided magnetic material, a dispersant, the conventional additives and a solution or a dispersion of a polymeric binder, applying the dispersion in the form of a layer onto a non-magnetizable base, orienting the anisotropic magnetic material by means of a magnetic field and drying the applied layer, by a process in which the dispersant employed is obtained by reacting A. from 70 to 95 parts by weight of a reaction product of
  I. from 0.5 to 1.5 moles of an oxoalcohol of 6 to 20 carbon atoms,
  II. from 6 to 18 moles of ethylene oxide and
  III. from 2 to 10 moles of propylene oxide, with
B. from 5 to 30 parts by weight of a polyphosphoric acid having a $P_2O_5$ content of from 80 to 88%.

1 Claim, No Drawings

PRODUCTION OF MAGNETIC RECORDING MEDIA

The present invention relates to a process for the production of magnetic recording media by preparing a dispersion consisting of finely divided magnetic material, a dispersant, the conventional additives and a solution or dispersion of a polymeric binder, applying the dispersion in the form of a layer onto a non-magnetizable base, orienting the anisotropic magnetic material in a magnetic field and drying the applied layer.

Magnetic layers of recording media which are used in modern audio, video and data recording and playback apparatuses have to meet a number of different requirements. In addition to having outstanding mechanical properties such as high flexibility, elasticity, tensile strength and abrasion resistance, the magnetic layers must also exhibit excellent electroacoustic characteristics, particularly where cassette audio tapes, open-reel audio tapes and video tapes are concerned. In order to achieve this object, it is necessary not only to use particularly suitable magnetic pigments, such as finely divided iron oxides, chromium dioxide, cobalt-doped iron oxides and ferromagnetic metal particles, but also to match all the materials present in the magnetic layer so that the latter has particularly high remanence in the recording direction and an extremely smooth surface. Although such magnetic layers must contain a large amount of magnetizable material, the magnetizable acicular particles must be capable of being distributed very uniformly throughout the magnetic layer and so oriented that they lie to a very substantial extent parallel to the intended recording direction. For a given magnetic material, the improvement in the abovementioned properties, such as surface smoothness, switching field distribution, remanence and orientation ratio, depends to a high degree on the binders and additives used in the production of the magnetic layer. These also influence the abrasion characteristics, the frictional properties and other performance characteristics. Of the additives, it is primarily the dispersants which, by improving the dispersibility of the magnetic pigment, influence the packing density and the orientability of the particles in the polymeric binders, and hence the electroacoustic properties and the mechanical properties of the magnetic layer.

Reduction of the surface roughness of the magnetic layer is particularly important in the case of high-quality magnetic recording media intended to record a wide bandwidth including high frequencies, since particularly close tape/head contact is required for resolving very short wavelengths. Any unevenness alters the distance between the tape surface and the head and hence results in signal losses at high frequencies. It is prior art practise to smoothen the surface of the magnetic coating, after the coating operation, by passing the coated base material between heated rollers under pressure. However, the smoothness achievable by this treatment depends substantially on the original smoothness of the dried layer; layers which are originally very rough cannot be made as smooth by calendering as those which exhibit slight roughness before calendering.

Usually, the dispersants are added at the beginning of the dispersing operation, in order to facilitate dispersion of the magnetic material in the binder. The surfactants primarily used for this purpose are those whose molecular structure possesses a hydrophilic and a hydrophobic radical and whose active structure has anionic, cationic, amphoteric or non-ionic character. The amount of these dispersants used must be very carefully matched to the rest of the formulation, since, under unfavorable external conditions, an excess of these substances can very easily exude from the surface of the magnetic coating and form deposits thereon and subsequently on the parts of the recording/playback apparatus with which the recording medium comes into contact, which is extremely undesirable. Moreover, in the case of most dispersants, it is found that, when they reach a certain concentration, which corresponds to saturation of the active centers of the magnetic pigment surface, no further improvement in the dispersibility and hence in the packing density and orientability of the magnetic materials can be achieved, and the mechanical properties of the magnetic layer, in particular the abrasion characteristics, deteriorate as the amount of dispersant metered in is increased.

It is an object of the present invention to provide a process for the production of magnetic recording media in which the magnetic particles are evenly distributed throughout the magnetic layer, and which possess, in particular, a favorable switching field distribution, a high orientation ratio, high remanence and hence very good recording properties, and exhibit good abrasion resistance and good frictional properties as well as a smooth surface.

We have found that this object is achieved, and that magnetic recording media having the required properties can be obtained, by preparing a dispersion consisting of finely divided magnetic material, a dispersant, the conventional additives and a solution or a dispersion of a polymeric binder, applying the dispersion in the form of a layer onto a non-magnetizable base, orienting the anisotropic magnetic material by means of a magnetic field and drying the applied layer, if the dispersant employed is obtained by reacting A. from 70 to 95 parts by weight of a reaction product of
 I. from 0.5 to 1.5 moles of an oxoalcohol of 6 to 20 carbon atoms,
 II. from 6 to 18 moles of ethylene oxide and
 III. from 2 to 10 moles of propylene oxide with
B. from 5 to 30 parts by weight of a polyphosphoric acid having a $P_2O_5$ content of from 80 to 88%.

In a particularly advantageous embodiment of the novel process, the dispersant employed is obtained by reacting A. 90 parts by weight of a reaction product of
 I. 1 mole of an oxoalcohol of from 13 to 15 carbon atoms,
 II. 12 moles of ethylene oxide and
 III. 6 moles of propylene oxide with
B. 10 parts by weight of a polyphosphoric acid having a $P_2O_5$ content of 84%.

The dispersant used for the novel process is prepared by reacting the oxoalcohol (component A.I.) with the ethylene oxide and propylene oxide in the stated proportions in the presence of a strong alkali. The resulting reaction product is then reacted with the polyphosphoric acid (component B), after the alkali has been neutralized.

This dispersant which is used in the process according to the invention is added to the mixture to be dispersed in an amount of from 0.5 to 10, preferably from 1.5 to 5, percent by weight, based on the amount of magnetic material. If the magnetic layer is produced using other conventional additives which, in addition to having other effects, such as improving the frictional properties or the flow, also promote dispersing, the advantageous action of the dispersant according to the invention is not adversely affected in any way.

The preparation of the magnetic dispersion is carried out in a conventional manner.

Preferably used magnetic materials are finely divided acicular gamma-iron(III) oxide and acicular chromium dioxide, each having a mean particle size of from 0.1 to 2 μm, in particular from 0.1 to 0.9 μm. Other suitable materials are gamma-iron(III) oxide doped with heavy metals, in particular with cobalt, and finely divided metal alloys of iron, cobalt and/or nickel.

Suitable binders for the dispersion of the finely divided magnetic material are those which are conventionally used for the preparation of magnetic layers, such as a nylon copolymer which is soluble in conventional solvents, a polyvinylformal, a polyurethane elastomer, mixtures of polyisocyanates and relatively high molecular weight polyhydroxy compounds or vinyl chloride polymers containing more than 60% of vinyl chloride units, for example a vinyl chloride copolymer containing one or more comonomers, such as a vinylester of a monocarboxylic acid of 2 to 9 carbon atoms, or an ester of an aliphatic alcohol of 1 to 9 carbon atoms and an ethylenically unsaturated carboxylic acid of 3 to 5 carbon atoms, such as the esters of acrylic acid, methacrylic acid or maleic acid, or a copolymer of vinyl chloride with one or more of these carboxylic acids themselves as comonomers, or hydroxyl-containing vinyl chloride copolymers which can be prepared by partial hydrolysis of vinyl chloride/vinyl ester copolymers or direct copolymerization of vinyl chloride with hydroxyl-containing monomers, e.g. allyl alcohol or 4-hydroxybutyl or 2-hydroxyethyl (meth)acrylate. Other suitable binders are mixtures of one or more polyurethane elastomers with polyvinylformals, phenoxy resins and vinyl chloride copolymers of the above-mentioned composition. Preferably used polyurethane elastomer binders are commercial elastomeric polyurethanes obtained from adipic acid, butane-1,4-diol and 4,4′-diisocyanatodiphenylmethane.

OH-containing polyurea-urethane binders which are cross-linked with a polyisocyanate are also advantageous, the OH-containing polyurea-urethane being obtained by reacting a polydiol, a diol and a primary or secondary aminoalcohol, and if appropriate a triol, with a diisocyanate.

Magnetic dispersions which are particularly useful for the production of rigid magnetic disks preferably contain, as binders, for example epoxy resins, phenoxy resins, aminoplast precondensates, polyester resins, polyurethanes or polyurethane formers, and mixtures of such binders with one another and with other binders, such as polycarbonates or vinyl polymers, e.g. vinyl chloride or vinylidene chloride copolymers or thermosetting acrylate or methacrylate copolymers.

Aqueous dispersions of organic polymers may also be used as binders. Particularly suitable for this purpose are the polyurethane ionomers described in, for example, German Laid-Open Applications Nos. DOS 2,920,334 and DOS 3,005,009.

Other additives used in the production of magnetic layers, for example small amounts of monocarboxylic acids, or mixtures or esters thereof, as well as fillers, such as carbon black, graphite, quartz flour and/or non-magnetizable powders based on silicates, and flow improvers, such as small amounts of silicone oil, may be added to the dispersions. Advantageously, the total amount of these additives should not exceed 12, preferably 8, percent by weight, based on the magnetic material.

The magnetic dispersion is prepared in a conventional manner, the magnetic material being dispersed with some of the binder solution used, a sufficient amount of solvent and the dispersant in a dispersing apparatus, for example a tubular ball mill or a stirred ball mill, with or without the addition of other additives. Milling is continued until the magnetic material is finely dispersed to the desired extent. Thereafter, the remainder of the binder solution and other additives are added, and are homogenized with the rest of the dispersion by further milling or thorough stirring. In some cases, it is also possible to introduce all of the components of the dispersion into the mill and to carry out dispersing in one phase. Subsequent repeated filtration gives a completely homogeneous magnetic dispersion.

The magnetic dispersion is then applied to the non-magnetizable base with the aid of a conventional coating apparatus, e.g. a knife coater. Depending on the intended use of the resulting magnetic recording medium, it may be advantageous to add isocyanates or other crosslinking substances to the dispersion immediately before the latter is applied. A conventional base, in particular a film of a linear polyester, such as polyethylene terephthalate, in general from 1 to 200 μm, in particular from 6 to 36 μm, thick, can be used as the non-magnetic and non-magnetizable base. Before the still fluid coating mix is dried on the base, an operation which is advantageously carried out at from 50° to 90° C. for from 2 to 5 minutes, the anisotropic magnetic particles are oriented in the intended recording direction by the action of a magnetic field. The magnetic layer can then be subjected to a conventional surface treatment, e.g. calendering in which the coated base material is passed between polished rollers optionally heated to a temperature of from 50° to 100° C., preferably from 60° to 80° C. The magnetic layer is in general from 1 to 20 μm thick.

The magnetic recording media produced according to the invention possess a more homogeneous magnetic layer and hence exhibit only slight surface roughness and an improved switching field distribution, a high orientation ratio and high remanence. This results in a stronger playback signal and a higher maximum output level at both low and high frequencies. The magnetic layer of the novel recording media also exhibits improved mechanical properties, in particular higher abrasion resistance and lower coefficients of friction, and hence a longer life. The novel process is equally advantageous for producing video and data recording media. In addition to the improvement in the homogeneity and in the mechanical properties of the layer which have been described above, there is also an improvement in the signal/noise ratio and the RF level, and a reduction in the number of errors in the case of video recording media, while an improvement in the output level, resolution and overwriting characteristics is found in the case of data recording media.

Phosphoric acid derivatives such as are disclosed in Japanese patent application Nos. 57,113,421, 57,152,535, 57,152,536, 57,205,461, 54,094,308, 58,141,439 and 58,141,440 are known as dispersants or other assistants for the production of magnetic recording media. However, the mechanical properties, particularly the abrasion resistance and frictional properties, of the media produced with them are inferior to those of the magnetic recording media produced by the novel process, and hence the products do not exhibit the same durability or operational reliability.

Furthermore, when these conventional dispersants are added in increasing amounts over and above that required for saturation of the active centers of the magnetic pigment surface, there is an increasing deterioration in the mechanical properties, such as the wear resistance and frictional properties, of the magnetic layer, whereas, in the process according to the invention, the advantageous frictional properties and good abrasion resistance are unaffected even when amounts greatly in excess of the amount required for saturation of the said active centers are metered in.

The Examples which follow illustrate the advantages of the novel process.

EXAMPLE A 258 g of an oxoalcohol were initially charged into a 3 l autoclave, and 3 g of potassium hydroxide flakes were added. The apparatus was heated to 120° C. and evacuated to 3 mm Hg. The vacuum was then released by introducing nitrogen, and a mixture of 724 g of ethylene oxide and 537 g of propylene oxide was added a little at a time. After a reaction time of 3 hours, the product was cooled to 70° C. and neutralized with acetic acid. 233 g of polyphosphoric acid (84% of $P_2O_5$) were then added, and the mixture was stirred for 6 hours. The resulting product was used as dispersant.

EXAMPLE 1

900 g of a $\gamma$-$Fe_2O_3$ prepared from $\alpha$-FeOOH and having a coercive force of 30 kA/m and a specific surface area of 23.7 m$^2$/g, and (a) 31.5 g of the product described in Example A or (b) 40.5 g of the product described in Example A, together with, in each case, 850 g of a solvent mixture consisting of equal amounts of tetrahydrofuran and dioxane, 276.9 g of a 13% strength solution of a polyester polyurethane having a K value of 60, prepared from a polyester obtained from butanediol and adipic acid (0.42 mole), butanediol (0.55 mole), trimethylolpropane (0.03 mole) and diphenylmethane diisocyanate (1.05 mole), in the abovementioned solvent mixture, and 120.1 g of a 20% strength solution of an 80:10:10 vinyl chloride/dimethyl maleate/diethyl maleate copolymer having a K value of 60, in the abovementioned solvent mixture, were introduced into steel ball mills which had a capacity of 6 l and were charged with 8 kg of steel balls having a diameter of from 4 to 6 mm, and each mixture was dispersed for 90 hours. Subsequently, 578 g of polyurethane solution, 250 g of copolymer solution, 0.9 g of silicone oil, 0.9 g of hydroquinone, 1.8 g of n-butyl stearate and 9 g of isostearic acid were added, dispersing was continued for a further 2 hours and the dispersion was then removed from the mill and filtered under pressure through a filter having 5 $\mu$m pores. After the filtration step, 6.7 g of a 75% strength solution of a triisocyanate obtained from 3 moles of toluylene diisocyanate and 1 mole of trimethylolpropane in ethyl acetate were added per kg of dispersion, while stirring vigorously. Directly thereafter, the dispersion was applied to a 12 $\mu$m thick polyethylene terephthalate film by means of a conventional knife coater. The coated film was passed through a magnetic field to orient the magnetic particles and was then dried at from 50 to 90° C., after which the magnetic layer was calendered by passing the coated film between rollers heated at 70° C., under a nip pressure of 200 kp/cm, so that the thickness of the magnetic layer was 4.5 $\mu$m. The film was then slit into 3.81 mm wide tapes for audio use.

The roughness of the magnetic layer was measured with a Perthometer from Fa. Perthen, Hanover, Germany, while the gloss was measured using a reflectometer from Lange (measuring head 60°). The magnetic properties were measured in a magnetic field of 100 kA/m, and the electroacoustic properties were determined in accordance with DIN 45,401, DIN 45,403 and DIN 45,512, sheet 12, against the IEC I reference tape.

The mechanical properties of the tapes were determined in the following tests:

Coefficient of friction, magnetic layer/steel, before-/after sustained operation.

The coefficients of friction were determined according to DIN 45,522, Sheet 1, on the virgin tape and on a tape which had been in use for a prolonged period.

Friction at very low relative velocity

The coefficient of friction was determined by measuring the tensile force produced by the friction between a moving magnetic tape and a stationary drum made of steel and having a surface roughness of about 0.15 $\mu$m and a diameter of 70 mm. The piece of tape was 25 cm long and was drawn, under a tension of 20 cN, over the drum at a velocity of 1 mm/sec, the wraparound angle being 180°. The tensile force exerted on the drum, F, is a measure of the coefficient of friction $\mu$, where $$\mu = \frac{1}{\pi} \times \ln \frac{F}{20}.$$

Abrasion resistance on the recorder

The number of passes on a Kenwood Trio KX recorder until a drop in output level of >2 dB occurred is given as the life. The amount of abraded material deposited on the erasing head, recording/playback head and capstan was removed by means of adhesive tape and assessed according to a rating system of 1 to 6 (1 denoting no abrasion and 6 very pronounced abrasion).

Chalking

The tape in the form of a loop 167 cm in length was drawn over abrasive paper at a speed of 24 cm/sec and under a tension of 50 p. After a period of 7 minutes (corresponding to about 60 passes of the loop), the coloration produced by the abraded material on the paper was assessed according to a rating system of 1 to 10 (1 denoting no coloration, and 10 very pronounced coloration).

The test results are shown in Table 1.

COMPARATIVE EXPERIMENT 1

The procedure described in Example 1 was followed, except that, instead of the dispersant described in Example 1, (a) 63 g and (b) 81 g of a commercial dispersant consisting of a mixture of a monophosphate and a salt of a sulfosuccinic acid in 50% strength aqueous solution were used.

COMPARATIVE EXPERIMENT 2

The procedure described in Example 1 was followed, except that, instead of the dispersant described in Example A, (a) 31.5 g and (b) 40.5 g of a commercial oxyalkylated acidic phosphate, Gafac RA 600 from GAF Corp., were used.

COMPARATIVE EXPERIMENT 3

The procedure described in Example 1 was followed, except that, instead of the dispersant described in Example A, (a) 31.5 g and (b) 40.5 g of a commercial oxyalkylated acidic phosphate, Gafac RM 710 from GAF Corp., were used.

COMPARATIVE EXPERIMENT 4

The procedure described in Example 1 was followed, except that, instead of the dispersant described in Example A, (a) 31.5 g and (b) 40.5 g of a commercial oxyalkylated acidic phosphate, Gafac RE 610 from GAF Corp., were used.

COMPARATIVE EXPERIMENT 5

The procedure described in Example 1 was followed, except that, instead of the dispersant described in Example A, (a) 31.5 g and (b) 40.5 g of a commercial oxyalkylated acidic phosphate, Dextrol OC 20 from Boehringer KG (Ingelheim), were used.

COMPARATIVE EXPERIMENT 6

The procedure described in Example 1 was followed, except that, instead of the dispersant described in Example A, (a) 31.5 g and (b) 40.5 g of a commercial oxyalkylated acidic phosphate, Dextrol OC 70 from Boehringer KG, were used.

The results obtained in the comparative experiments are also given in Table 1.

The results listed in Table 1 show that the use of the dispersant described in Example A improves both the magnetic properties, in particular the switching field distribution (SFD), and the overall electroacoustic data. The improvement in the homogeneity of the magnetic layer is also evident from the better tape surface even before calendering, the tape surface being characterized by its roughness and gloss. Moreover, the coefficients of friction (magnetic layer/steel) before and after sustained operation, the friction at very low relative velocity and the abrasion resistance on the recorder were found to be substantially superior. This results in an improvement in the operational reliability and life of the magnetic recording media. It has also been found that, when the dispersant according to Example A is used, metering in an excessive amount is not critical.

EXAMPLE 2

900 g of Co-doped $\gamma$-$Fe_2O_3$ having a coercive force of 30 kA/m and a specific surface area of 25.8 $m^2/g$ together with 45.0 g of the dispersant described in Example A, 850 g of a solvent mixture consisting of equal amounts of tetrahydrofuran and dioxane, 276.9 g of a 13% strength solution of a polyesterpolyurethane having a K value of 60, prepared from a polyester obtained from butanediol and adipic acid (0.42 mole), butanediol (0.55 mole), trimethylolpropane (0.03 mole) and diphenylmethane diisocyanate (1.05 mole), in the above-mentioned solvent mixture, and 120.1 g of a 20% strength solution of an 80:10:10 vinyl chloride/dimethyl maleate/diethyl maleate copolymer having a K value of 60, in the above-mentioned solvent mixture, were introduced into a steel ball mill which had a capacity of 6 l and was charged with 8 kg of steel balls having a diameter of from 4 to 6 mm, and the mixture was dispersed for 40 hours. Subsequently, 578 g of polyurethane solution, 250 g of copolymer solution, 0.9 g of silicone oil, 0.9 g of hydroquinone, 1.8 g of n-butyl stearate and 9 g of isostearic acid were added. After dispersing had been continued for a further 2 hours, the dispersion was removed from the mill and filtered under pressure through a filter having 5 $\mu m$ pores. After the filtration step, 6.7 g of a 75% strength solution of a triisocyanate obtained from 3 moles of toluylene diisocyanate and 1 mole of trimethylolpropane, in ethyl acetate, were added per kg of dispersion, while stirring vigorously. Directly thereafter, the dispersion was applied to a 12 $\mu m$ thick polyethylene terephthalate film by means of a conventional knife coater. The coated film was passed through a magnetic field to orient the magnetic particles and then dried at from 50° to 90° C. After drying, the magnetic layer was calendered by passing the coated film between rollers heated at 70° C., under a nip pressure of 200 kp/cm, so that the thickness of the magnetic layer was 4.5 $\mu m$. The film was then slit into 3.81 mm wide tapes for audio use.

The tape properties were measured in the same way as in Example 1, the results of the measurements being summarized in Table 2.

COMPARATIVE EXPERIMENT 7

The procedure described in Example 2 was followed, except that, instead of the dispersant described in Example A, 63 g of a commercial dispersant consisting of a mixture of a monophosphate and a salt of a sulfosuccinic acid in 50% strength aqueous solution (Serad Fa 601 from Servo Company, Delden, The Netherlands) were used.

The results obtained in this comparative experiment are given in Table 2.

The dispersant in Example 2 and that in Comparative Experiment 7 were each metered in until the saturation concentration was reached.

Comparison of the measured values in Table 2 shows that the product according to Example 2 has better magnetic properties, in particular a higher coercive force and a more favorable switching field distribution, and better overall electroacoustic properties than the product of Comparative Experiment 7. The improved homogeneity of the magnetic layer is also evident from the better tape surface even before calendering, and is characterized by great smoothness and high gloss. The product according to Example 2 also has substantially superior frictional properties (magnetic layer/steel) before and after sustained operation, and exhibits less friction at very low relative velocity and, in particular better abrasion resistance and a longer life. The improvement in the abrasion resistance is also confirmed in the chalking test.

EXAMPLE 3

900 g of a $CrO_2$ having a coercive force of 41 kA/m and a specific surface area of 27 $m^2/g$, together with (a) 10.8 g and (b) 40.5 g of the product described in Example A, and, in each case, 9 g of zinc oleate, 760 g of a solvent mixture consisting of equal amounts of tetrahydrofuran and dioxane, 538 g of a 13% strength solution of a polyesterpolyurethane having a K value of 60, prepared from a polyester obtained from butanediol and adipic acid (0.42 mole), butanediol (0.55 mole), trimethylolpropane (0.03 mole) and diphenylmethane diisocyanate (1.05 mole), in the abovementioned solvent mixture, and 150 g of a 20% strength solution of an 80:10:10 vinyl chloride/dimethyl maleate/diethyl maleate copolymer having a K value of 60, in the abovementioned solvent mixture, were introduced into a steel ball mill which had a capacity of 6 l and was charged with 8 kg of steel balls having a diameter of from 4 to 6 mm, and the mixture was dispersed for 130 hours. Subsequently, 571 g of the stated polyurethane solution, 150 g of the copolymer solution mentioned and 2.2 g of silicone oil were added, and dispersing was continued for a further 10 hours. The dispersion was removed from the mill, filtered under pressure through a filter having 3 μm pores and then applied to a 12 μm thick polyethylene terephthalate film by means of a conventional knife coater. The coated film was passed through a magnetic field to orient the magnetic particles and was then dried at from 50° to 90° C. After drying, the magnetic layer was calendered by passing the coated film between rollers heated at 70° C., under a nip pressure of 200 kp/cm, so that the thickness of the magnetic layer was 4.5 μm. The film was then slit into 3.81 mm wide tapes for audio use.

Measurements were carried out in the same way as in Example 1, except that the tapes' electroacoustic properties were compared with those of reference tape IEC II.

The results of the measurements are given in Table 3.

COMPARATIVE EXPERIMENT 8

The procedure described in Example 3 was followed, except that, instead of the dispersant described in Example A, (a) 10.8 g and (b) 40.5 g of a commercial oxyalkylated acidic phosphate, Gafac RE 610 from GAF Corp., were used.

COMPARATIVE EXPERIMENT 9

The procedure described in Example 3 was followed, except that, instead of the dispersant described in Example A, (a) 63 g and (b) 81 g of a commercial dispersant consisting of a mixture of a monophosphate and a salt of a sulfosuccinic acid in 50% strength aqueous solution (Serad Fa 601 from Servo Company, Delden, The Netherlands) were used.

The results obtained in the comparative experiments are also shown in Table 3.

Comparison of the results listed in Table 3 shows that the product according to Example 3 has better magnetic properties, in particular a more favorable switching field distribution and a higher orientation ratio, and better overall electroacoustic properties. The improved homogeneity of the magnetic layer according to Example 3 is also evident from the greater smoothness and the higher gloss even before calendering. Moreover, the frictional properties, the life, the abrasion resistance on the recorder and the chalking behavior are substantially superior.

TABLE 1

| | Example 1 | | Comparative experiments | | | | | | | | | | | |
|---|---|---|---|---|---|---|---|---|---|---|---|---|---|---|
| | | | 1 | | 2 | | 3 | | 4 | | 5 | | 6 | |
| | a | b | a | b | a | b | a | b | a | b | a | b | a | b |
| Non-calendered material: | | | | | | | | | | | | | | |
| Average peak-to-valley height Rz (μm) | 0.40 | 0.43 | 0.45 | 0.48 | 0.48 | 0.48 | 0.45 | 0.46 | 0.43 | 0.46 | 0.50 | 0.55 | 0.46 | 0.53 |
| Gloss | 67 | 70 | 58 | 60 | 61 | 60 | 61 | 60 | 62 | 61 | 62 | 59 | 60 | 58 |
| Calendered material: | | | | | | | | | | | | | | |
| Coercive force (kA/m) | 30.3 | 30.3 | 29.1 | 29.0 | 30.2 | 30.1 | 30.1 | 30.3 | 30.3 | 30.2 | 30.2 | 30.2 | 30.2 | 30.2 |
| Remanence (mT) | 158 | 160 | 157 | 158 | 160 | 159 | 152 | 158 | 155 | 157 | 155 | 159 | 155 | 158 |
| Relative remanence | 0.84 | 0.84 | 0.82 | 0.82 | 0.83 | 0.82 | 0.82 | 0.83 | 0.83 | 0.83 | 0.83 | 0.83 | 0.83 | 0.83 |
| Orientation ratio | 2.2 | 2.2 | 2.1 | 2.0 | 2.1 | 2.1 | 2.1 | 2.2 | 2.1 | 2.2 | 2.1 | 2.2 | 2.1 | 2.2 |
| Switching field distribution | 0.25 | 0.26 | 0.30 | 0.30 | 0.27 | 0.27 | 0.28 | 0.27 | 0.26 | 0.27 | 0.26 | 0.26 | 0.27 | 0.27 |
| Electroacoustic data (against reference tape IEC I): | | | | | | | | | | | | | | |
| Sensitivity 315 Hz(dB) | −0.2 | −0.2 | −0.5 | −0.4 | −0.2 | −0.2 | −0.7 | −0 | −0.7 | −0.3 | −0.2 | −0.2 | −0.2 | −0.2 |
| Sensitivity 10 kHz(dB) | +1.5 | +1.7 | +1.0 | +1.0 | +1.3 | +1.3 | +1.7 | +1.5 | +1.6 | +1.3 | +1.3 | +1.3 | +1.0 | +1.3 |
| Maximum output level 315 Hz(dB) | −0.7 | −0.7 | −1.0 | −1.1 | −0.8 | −1.1 | −1.7 | −1.4 | −1.6 | −1.5 | −1.8 | −1.1 | −1.5 | −1.3 |
| Maximum output level 10 kHz(bB) | +2.5 | +2.6 | +1.5 | +1.6 | +2.1 | +2.0 | +2.3 | +2.3 | +2.3 | +2.3 | +2.1 | +2.3 | +1.6 | +2.7 |
| Mechanical properties: Coefficient of friction (magnetic layer/steel) | | | | | | | | | | | | | | |
| Before sustained operation | 0.28 | 0.27 | 0.33 | 0.34 | 0.33 | 0.40 | 0.33 | 0.35 | 0.35 | 0.33 | 0.35 | 0.37 | 0.35 | 0.40 |
| After sustained operation | 0.32 | 0.35 | 0.38 | 0.40 | 0.55 | 0.57 | 0.40 | 0.40 | 0.41 | 0.52 | 0.45 | 0.50 | 0.48 | 0.55 |
| Friction at very low relative velocity | 0.30 | 0.32 | 0.34 | 0.34 | 0.51 | 0.51 | 0.35 | 0.36 | 0.34 | 0.35 | 0.34 | 0.35 | 0.35 | 0.36 |
| Abrasion resistance on the recorder: Life - number of passes | 100 | 100 | 95 | 80 | 100 | 100 | 100 | 80 | 90 | 100 | 100 | 100 | 100 | 42 |
| Deposits on erasing head, rating | 2 | 2 | 4 | 4 | 3.5 | 3.5 | 3.5 | 3 | 3.5 | 3 | 3 | 3 | 4 | 3 |
| Deposits on recording/reproducing head, rating | 2.5 | 2.5 | 5.5 | 6 | 3.5 | 3 | 3 | 3.5 | 3.5 | 3.5 | 3 | 4 | 6 | 3 |
| Deposits on capstan, rating | 1 | 1 | 2.5 | 3 | 2 | 2 | 2 | 2 | 2 | 2 | 2.5 | 2 | 2 | 2 |

TABLE 1-continued

| | Example 1 | | Comparative experiments | | | | | | | | | | |
|---|---|---|---|---|---|---|---|---|---|---|---|---|---|
| | | | 1 | | 2 | | 3 | | 4 | | 5 | | 6 |
| | a | b | a | b | a | b | a | b | a | b | a | b | a | b |
| Chalking, rating | 3 | 3 | 5 | 6 | 5 | 6 | 5 | 5 | 5 | 5 | 5 | 5 | 5 | 6 |

TABLE 2

| | Example 2 | Comparative Experiment 7 |
|---|---|---|
| Non-calendered material: | | |
| Average peak-to-valley height Rz (μm) | 0.45 | 0.64 |
| Gloss | 68 | 56 |
| Calendered material: | | |
| Coercive force (kA/m) | 30.4 | 29.7 |
| Remanence (mT) | 173 | 170 |
| Relative remanence | 0.88 | 0.87 |
| Orientation ratio | 2.9 | 2.8 |
| Switching field distribution | 0.21 | 0.24 |
| Electroacoustic data (against reference tape IEC I): | | |
| Sensitivity 315 Hz (dB) | +0.4 | +0.4 |
| Sensitivity 10 kHz (dB) | +2.4 | +1.8 |
| Maximum output level 315 Hz (dB) | ±0 | −0.3 |
| Maximum output level 10 kHz (dB) | +2.8 | +2.0 |
| Mechanical properties: | | |
| Coefficient of friction (magnetic layer/steel) | | |
| Before sustained operation | 0.29 | 0.33 |
| After sustained operation | 0.34 | 0.50 |
| Friction at very low relative velocity | 0.32 | 0.42 |
| Abrasion resistance on the recorder: | | |
| Life - number of passes | 100 | 50 |
| Deposits on erasing head, rating | 2.5 | 4 |
| Deposits on recording/reproducing head, rating | 2.5 | 4.5 |
| Deposits on capstan, rating | 1 | 3.5 |
| Chalking, rating | 3 | 7 |

TABLE 3

| | Example 3 | | Comparative Experiment 8 | | Comparative Experiment 9 | |
|---|---|---|---|---|---|---|
| | a | b | a | b | a | b |
| Non-calendered material: | | | | | | |
| Average peak-to-valley height Rz (μm) | 0.60 | 0.61 | 0.90 | 0.92 | 0.80 | 0.85 |
| Gloss | 30 | 30 | 25 | 24 | 26 | 25 |
| Surface treated: | | | | | | |
| Coercive force (kA/m) | 40.9 | 41.0 | 40.5 | 40.4 | 39.9 | 40.0 |
| Remanence (mT) | 175 | 174 | 171 | 170 | 172 | 171 |
| Relative remanence | 0.89 | 0.89 | 0.88 | 0.88 | 0.89 | 0.88 |
| Orientation ratio | 3.8 | 3.7 | 3.4 | 3.3 | 3.5 | 3.4 |
| Switching field distribution | 0.26 | 0.26 | 0.27 | 0.28 | 0.27 | 0.28 |
| Electroacoustic data (against reference tape IEC II): | | | | | | |
| Sensitivity 315 Hz (dB) | +0.6 | +0.5 | +0.3 | +0.2 | +0.4 | +0.3 |
| Sensitivity 10 kHz (dB) | +0.4 | +0.4 | ±0 | ±0 | −0.5 | −0.6 |
| Maximum output level 315 Hz (dB) | +1.0 | +0.9 | +0.7 | +0.3 | +0.6 | +0.5 |
| Maximum output level 10 kHz (dB) | +0.5 | +0.4 | +0.2 | ±0 | −0.6 | −0.7 |
| Mechanical properties: | | | | | | |
| Coefficient of friction (magnetic layer/steel) | | | | | | |
| Before sustained operation | 0.26 | 0.27 | 0.32 | 0.34 | 0.34 | 0.36 |
| After sustained operation | 0.32 | 0.34 | 0.45 | 0.47 | 0.50 | 0.55 |
| Friction at very low relative velocity | 0.26 | 0.28 | 0.38 | 0.40 | 0.37 | 0.39 |
| Abrasion resistance on the recorder: | | | | | | |
| Life - number of cycles | 100 | 100 | 90 | 85 | 70 | 60 |
| Deposits on erasing head, rating | 2.5 | 2.5 | 3.5 | 4 | 4 | 4 |
| Deposits on recording/reproducing head, rating | 3 | 3 | 4 | 4 | 4 | 5 |
| Deposits on capstan, rating | 1 | 1 | 2 | 1 | 2 | 2 |
| Chalking, rating | 5 | 5 | 8 | 8 | 9 | 9 |

We claim:

1. A process for the production of a magnetic recording medium by preparing a dispersion consisting of finely divided magnetic material, a dispersant, the conventional additives and a solution or a dispersion of a polymeric binder, applying the dispersion in the form of a layer onto a non-magnetizable base, orienting the anisotropic magnetic material by means of a magnetic field and drying the applied layer, wherein the dispersant employed is obtained by reacting A. from 70 to 95 parts by weight of a reaction product of
 I. from 0.5 to 1.5 moles of an oxoalcohol of 6 to 20 carbon atoms,
 II. from 6 to 18 moles of ethylene oxide and
 III. from 2 to 10 moles of propylene oxide, with
B. from 5 to 30 parts by weight of a polyphosphoric acid having a $P_2O_5$ content of from 80 to 88%.

* * * * *